United States Patent [19]

Tamura et al.

[11] Patent Number: 4,851,679

[45] Date of Patent: * Jul. 25, 1989

[54] RADIATION IMAGE RECORDING AND READ-OUT APPARATUS

[75] Inventors: Kaoru Tamura; Toshitaka Aagano, both of Kanagawa, Japan

[73] Assignee: Fuji Photo film Co., Ltd., Kanagawa, Japan

[*] Notice: The portion of the term of this patent subsequent to Aug. 9, 2005 has been disclaimed.

[21] Appl. No.: 37,119

[22] Filed: Apr. 13, 1987

Related U.S. Application Data

[63] Continuation of Ser. No. 600,689, Apr. 16, 1984, abandoned.

[30] Foreign Application Priority Data

Apr. 15, 1983 [JP] Japan .................................. 58-66730

[51] Int. Cl.$^4$ .......................................... G01N 23/04
[52] U.S. Cl. .................................................. 250/327.2
[58] Field of Search ........................... 250/484.1, 327.2

[56] References Cited

U.S. PATENT DOCUMENTS

| | | | |
|---|---|---|---|
| 2,756,343 | 7/1956 | Johnson | 250/337 |
| 3,444,372 | 5/1969 | De Hart | 250/484.1 |
| 4,245,835 | 1/1981 | Turner | 378/173 |
| 4,438,333 | 3/1984 | Teraoka et al. | 250/327.2 |
| 4,439,682 | 3/1984 | Matsumoto | 250/484.1 |
| 4,485,304 | 11/1984 | Teraoka et al. | 250/327.2 |
| 4,543,479 | 9/1985 | Kato | 250/327.2 |
| 4,578,582 | 3/1986 | Takano | 250/327.2 J |

FOREIGN PATENT DOCUMENTS 36242 2/1984 Japan .................................. 378/172

*Primary Examiner*—Carolyn E. Fields
*Attorney, Agent, or Firm*—Sughrue, Mion, Zinn, Macpeak & Seas

[57] ABSTRACT

A radiation image recording and read-out apparatus comprises an image recording section for recording a radiation image of an object on a stimulable phosphor sheet, a read-out section for scanning the stimulable phosphor sheet with stimulating rays and for detecting the light emitted therefrom upon stimulation, and an erasing section for releasing the radiation energy remaining in the stimulable phosphor sheet. The stimulable phosphor sheets are circulated through these sections by conveyer belts and reused for image recording. A shutter is positioned between the read-out section and the erasing section to prevent the erasing light from entering the read-out section at least when read-out is conducted in the read-out section.

13 Claims, 4 Drawing Sheets

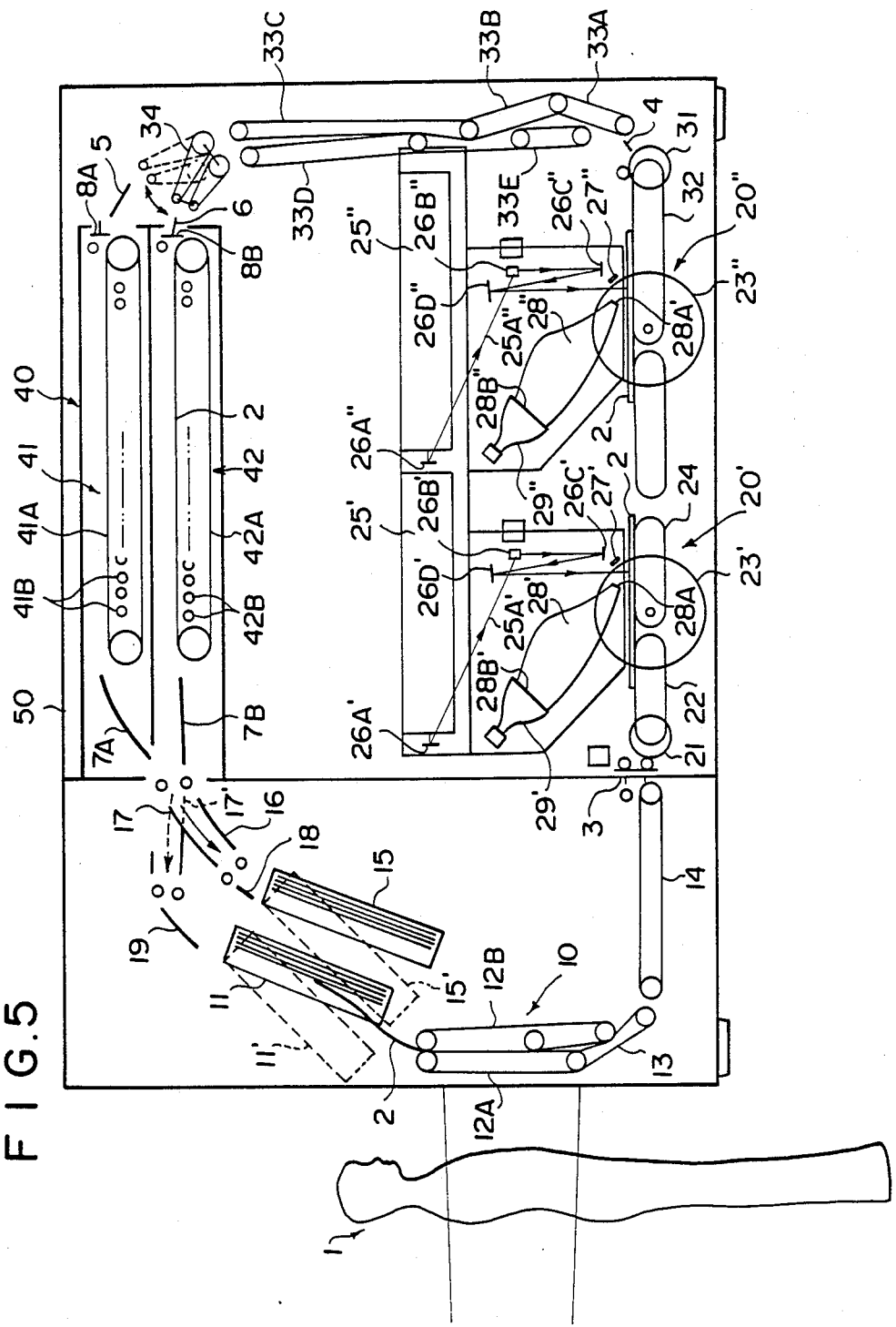

RADIATION IMAGE RECORDING AND READ-OUT APPARATUS

This is a continuation of application Ser. No. 600,689 filed Apr. 16, 1984 now abandoned.

BACKGROUND OF THE INVENTION

1. Field of the Invention

This invention relates to a radiation image recording and read-out apparatus for exposing a stimulable phosphor to a radiation to have a radiation image stored therein, scanning the stimulable phosphor with stimulating rays to cause the stimulable phosphor carrying the radiation image stored therein to emit light in proportion to the radiation energy stored, detecting the emitted light and converting it into an electric signal, and reproducing a visible image by use of the obtained electric signal. This invention particularly relates to a radiation image recording and read-out apparatus in which the stimulable phosphor is circulated and reused for recording radiation images.

2. Description of the Prior Art

When certain kinds of phosphors are exposed to a radiation such as X-rays, $\alpha$-rays, $\beta$-rays, $\gamma$-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. Nos. 4,258,264, 4,276,473, 4,315,318, and 4,387,428 and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load a mobile X-ray diagnostic station with a number of stimulable phosphor sheets, and the amount of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects in the stimulable phosphor sheets, transfer the electric image signals read out from the stimulable phosphor sheets into a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining in the stimulable phosphor sheet after it is scanned with stimulating rays to read out the radiation image stored therein should be eliminated or erased by the method as described, for example, in Japanese Unexamined Patent Publication No. 56(1981)-12599 or U.S. Pat. No. 4,400,619. The stimulable phosphor sheet should then be used again for radiation image recording.

Accordingly, it is desired that there be combined into a single apparatus: an image recording section for exposing each circulatable and reusable sheet composed of a stimulable phosphor to a radiation passing through an object, an image read-out section for reading out the radiation image stored in the stimulable phosphor sheet, and an erasing section for erasing the radiation energy remaining in the stimulable phosphor sheet after the readout step for the purpose of again recording another radiation image therein. This is because such an arrangement would make it possible to easily load the apparatus on the mobile X-ray diagnostic station to conduct medical examinations at different locations. Such an apparatus could also be easily installed in a hospital or the like. This is very advantageous in practical use.

However, in the radiation image recording and read-out apparatus as described above, when the image read-out section and the erasing section are housed in the same frame, the following problem arises. In the image read-out section, the stimulable phosphor sheet carrying a radiation image stored therein is exposed to and scanned with stimulating rays to sequentially release the radiation energy stored in the sheet as light emission, and the emitted light is detected and converted into an electric image signal. The photoelectric read-out means such as a photomultiplier which is used in the read-out step must have a very high sensitivity since the amount of light emitted from the stimulable phosphor sheet upon stimulation thereof is very small. Thus the photoelectric read-out means is susceptible to disturbance. On the other hand, in the erasing section, the stimulable phosphor sheet must be exposed to erasing light having a very high intensity in order to release the radiation energy remaining in the sheet after the read-out step. For this purpose, for example, many fluorescent lamps are positioned in the erasing section. Accordingly, erasing light emitted in the erasing section constitutes a very serious source of disturbance in the read-out operation in the image read-out section. Therefore, the image read-out section must be completely shielded from erasing light. That is, a light shielding means must be provided to prevent erasing light from entering the image read-out section.

SUMMARY OF THE INVENTION

The primary object of the present invention is to provide a radiation image recording and read-out apparatus in which stimulable phosphor sheets for recording radiation images therein are circulated and reused, and in which image recording is conducted at high speeds.

Another object of the present invention is to provide a radiation image recording and read-out apparatus which is small in size and suitable for conveying and installation even in a mobile X-ray diagnostic station for mass medical examinations.

The specific object of the present invention is to provide a radiation image recording and read-out apparatus in which the image read-out section and the erasing section are housed in the same frame so that erasing light emitted from the erasing section does not enter the image read-out section.

The radiation image recording and read-out apparatus in accordance with the present invention comprises:

(i) a circulating and conveying means for conveying at least one stimulable phosphor sheet for recording a radiation image thereon along a predetermined circulation path, (ii) an image recording section positioned on said circulation path for recording a radiation transmission image of an object on said stimulable phosphor sheet by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein in said image recording section, and a photoelectric read-out means for detecting light emitted from said stimulable phosphor sheet scanned with said stimulating rays to obtain an electric image signal, and (iv) an erasing section for, prior to the next image recording on said stimulable phosphor sheet for which the image read-out has been conducted in said image read-out section, exposing said stimulable phosphor sheet to erasing light to release the radiation energy remaining in said stimulable phosphor sheet.

In the present invention, since the stimulable phosphor sheets are circulated through the image recording section, the image read-out section and the erasing section, it is possible to reuse the stimulable phosphor sheets and to realize an apparatus which is small in size. Further, the apparatus of the present invention can conduct continuous image recording and thus is suitable for mass medical examinations. The technical effects of the present invention are very advantageous in practical use.

In one aspect of the present invention, at least the image read-out section and the erasing section are housed in the same frame, and a light shielding shutter is positioned between the image read-out section and the erasing section in the frame for preventing the erasing light from entering the image read-out section at least while the stimulable phosphor sheet is positioned in the image read-out section and image read-out is carried out. By saying that the image read-out section and the erasing section are housed in the same frame is meant that the image read-out section and the erasing section are secured to the same frame so as to construct the apparatus in a single unit form wherein the image read-out section and the erasing section are integrated with each other. The image recording section may also be housed in the same frame as that of the image read-out section and the erasing section. Alternatively, the image recording section may be housed in a frame separated from the frame in which the image read-out section and the erasing section are housed, and may be associated with the image read-out section and the erasing section by a conveying means such as a conveyor.

In the aspect of the present invention just described, the shutter is positioned between the image read-out section and the erasing section. When the stimulable phosphor sheet is positioned in the read-out section and image read-out is conducted, the shutter is closed to prevent erasing light from entering the read-out section. Therefore, the read-out operation is not disturbed by the erasing light, but instead can be conducted consistently at a high accuracy.

In the present invention, the electric image signal obtained in the image read-out section may be once stored in a recording medium such as a magnetic tape or a magnetic disk, displayed on a CRT or the like to immediately observe the radiation image, or permanently recorded as a hard copy on a photographic material or the like by use of a reproducing apparatus. The reproducing apparatus may be directly coupled with the radiation image recording and read-out apparatus in accordance with the present invention, installed separately from the radiation image recording and read-out apparatus for conducting reproduction via a memory, or placed at a remote position for carrying out reproduction through radio communication. In the last mentioned case, it is possible, for example, to reproduce the radiation image recorded in the mobile X-ray diagnostic station by use of a radio signal receiver in a hospital, and through radio communication to inform the mobile X-ray diagnostic station of the results of diagnosis conducted by a radiologist at the hospital.

The "stimulable phosphor" referred to in this invention means a phosphor which is able to store radiation energy therein upon exposure to a radiation such as X-rays, $\alpha$-rays, $\beta$-rays, $\gamma$-rays or ultraviolet rays, and then emit light in proportion to the stored energy of the radiation upon stimulation with stimulating rays such as visible light.

By "stimulable phosphor sheet" is meant a sheet-like recording material comprising the aforesaid stimulable phosphor. In general, the stimulable phosphor sheet is composed of a substrate and a stimulable phosphor layer overlaid on the substrate. The stimulable phosphor layer comprises an appropriate binder and the stimulable phosphor dispersed therein. When the stimulable phosphor layer is self-supporting, the stimulable phosphor layer can by itself form the stimulable phosphor sheet.

In the present invention, in order to improve the signal-to-noise ratio, it is preferable that the stimulable phosphor emit light having a wavelength range not overlapping upon the range of wavelength of the stimulating rays employed to excite the stimulable phosphor. Preferably, when a laser source which emits stimulating rays having a wavelength within the range between 600 nm and 700 nm, such as a He-Ne laser, is used, a stimulable phosphor which emits light having a wavelength within the range between 300 nm and 500 nm should be selected, as disclosed in U.S. Pat. No. 4,258,264.

As the stimulable phosphor, for example, rare earth activated alkaline earth metal fluorohalide phosphor is preferred. One example of this phosphor is, as shown in DEOS No. 2,928,245, a phosphor represented by the formula $(Ba_{1-x-y},Mg_x,Ca_y)FX:aEu^{2+}$ wherein X is at least one of Cl and Br, x and y are numbers satisfying $0<x+y\leq0.6$ and $xy\neq0$, and a is a number satisfying $10^{-6}\leq a\leq5\times10^{-2}$. Another example of this phosphor is, as shown in U.S. Pat. No. 4,239,968, a phosphor represented by the formula $(Ba_{1-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0\leq x\leq0.6$, and y is a number satisfying $0\leq y\leq0.2$. Further, as the stimulable phosphor to be used in this invention can be used ZnS:Cu,Pb; $BaO.xAl_2O_3$:Eu wherein $0.8\leq x\leq10$; and $M^{II}O.xSiO_2$:A wherein $M^{II}$ is Mg, Ca, Sr, Zn, Cd or Ba, A is Ce, Tb, Eu, Tm, Pb, Tl, Bi or Mn, and x is a number satisfying $0.5\leq x\leq2.5$, as shown in U.S. Pat. No. 4,326,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0<x<0.1$, as shown in U.S. Pat. No. 4,236,078. Among the above enumerated phosphors, the rare earth activated alkaline earth metal fluorohalide phosphor is the most preferable, among which barium fluorohalides are the most preferable in view of the high intensity of emission of light.

Further, barium fluorohalide phosphors added with a metal fluoride as disclosed in European Patent Publication No. 21,342, U.S. Pat. No. 4,512,911 or barium fluorohalide phosphors added with at least one of a metal chloride, a metal bromide and a metal iodide as disclosed in European Patent Publication No. 29,963 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in European Patent Publication No. 21,174, U.S. Pat. No. 4,394,581.

The radiation image recording and read-out apparatus in accordance with the present invention is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored in the stimulable phosphor varies over a very wide range in proportion to the amount of energy stored therein, it is possible to obtain an image having a desirable density regardless of the amount of exposure of the stimulable phosphor to the radiation by reading out the emitted light with an appropriate read-out gain and converting it to an electric signal to reproduce a visible image on a recording medium or a display device. The electric signal may further be processed as desired to obtain a radiation image suitable for viewing, particularly for diagnostic purposes. This is very advantageous in practical use.

As mentioned above, in the radiation image system using a stimulable phosphor sheet, compensation for deviation of the level of the radiation energy stored in the stimulable phosphor sheet from a desired level can easily be carried out by adjusting the read-out gain to an appropriate value when photoelectrically reading out the light emitted from the stimulable phosphor sheet upon stimulation thereof. Therefore, the quality of the reproduced radiation image is not adversely affected by a fluctuation in radiation dose due to fluctuating tube voltage or MAS value of the radiation source, a variation in the sensitivity of the stimulable phosphor sheet or the photodetector, a change in radiation dose according to the condition of the object, or a fluctuation in the radiation transmittance according to the object, and the like. Also, it is possible to obtain a desirable radiation image even when the radiation dose to the object is low. Further, it is possible to obtain a radiation image having a high image quality of high contrast, high sharpness and low noise, and the like, by converting the light emitted from the stimulable phosphor sheet into an electric signal, and processing the electric signal as desired. Particularly, when the radiation image is used for medical diagnosis, it is possible to obtain a radiation image processed in the manner most suitable for a particular portion of the human body such as the heart, the chest or the like, thereby realizing an improvement in diagnostic efficiency and accuracy.

However, in order to eliminate various influences caused by the fluctuation of radiographic exposure conditions and/or to obtain a radiation image having a high image quality or a high diagnostic efficiency and accuracy, it is necessary to investigate such image input conditions of the radiation image stored in the stimulable phosphor sheet as, for example, the level of radiation dose used for image recording, or the image input pattern which is determined by the portion of the body (e.g. the chest or the abdomen) or the radiographic method used, such as plain image or contrasted image radiographing, before reproducing the radiation image to a visible image, and then to adjust the read-out gain appropriately or to process the electric signal appropriately based on the detected image input conditions or the image input pattern. The image input conditions and the image input pattern will hereinafter be simply referred to as the image input information when they are referred to generically. It is also necessary to determine the scale factor to optimize the resolution according to the contrast of the image input pattern.

Investigation of the image input information may be conducted prior to the visible image reproduction by use of the method as disclosed in U.S. Pat. No. 4,284,889, which is based on the finding that the amount of light instantaneously emitted from the stimulable phosphor sheet upon exposure thereof to a radiation is proportional to the amount of the radiation energy stored in the stimulable phosphor sheet. In this method, image input information is investigated by detecting the instantaneously emitted light, and appropriate signal processing is carried out on the basis of the image input information in order to obtain a visible radiation image having an improved image quality, particularly a high diagnostic efficiency and accuracy. In this method, since it is possible to adjust the read-out gain to an appropriate value, to select an appropriate scale factor, or to conduct an appropriate mode of signal processing, a radiation image suitable for viewing, particularly for diagnostic purpose, can be obtained regardless of fluctuation of the radiographic exposure conditions. However, since the recording of a radiation image in the stimulable phosphor sheet and read-out of the recorded image from the stimulable phosphor sheet are usually carried out at different locations, a signal transfer system must be installed therebetween, necessitating a complicated and expensive apparatus.

Thus it is desired to simply and accurately detect the image input information of a radiation image stored in a stimulable phosphor sheet prior to a read-out operation for obtaining a visible image for viewing, particularly for diagnostic purposes, and to reproduce a radiation image having an improved image quality, particularly a high diagnostic efficiency and accuracy, on the basis of the detected image input information.

The aforesaid need can be satisfied by conducting in advance a read-out operation for detecting the image input information of a radiation image stored in a stimulable phosphor sheet (hereinafter referred to as the preliminary read-out) by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter carrying out the final read-out. In the final read-out, the read-out gain is adjusted, and/or the image processing conditions are determined appropriately on the basis of the image input information obtained by the preliminary read-out.

In one aspect of the present invention, the radiation image recording and read-out apparatus is provided with a means for conducting the preliminary read-out as described above, and a control means for adjusting the read-out conditions in the final read-out and/or the image processing conditions on the basis of the image input information obtained by the preliminary read-out.

The term "stimulation energy" as used herein means the effective energy of the stimulating rays which the stimulable phosphor sheet receives per unit area.

In the present invention, the stimulation energy of the stimulating rays applied to the stimulable phosphor sheet in the preliminary read-out should be of a level lower than the level of the stimulation energy of the stimulating rays used in the final read-out. As the ratio of the stimulation energy of the stimulating rays in the preliminary read-out to the stimulation energy of the stimulating rays in the final read-out approaches one, the amount of radiation energy remaining in the stimulable phosphor sheet after the preliminary read-out decreases. It has been found that, when the aforesaid ratio is smaller than one, it is possible to obtain a radiation image suitable for viewing, particularly for diagnostic purposes, by adjusting the read-out gain to an appropriate value. However, in order to obtain a radiation image having an improved image quality, particularly a high diagnostic efficiency and accuracy, the aforesaid ratio should preferably be as small as possible insofar as the image input information of the radiation image stored in the stimulable phosphor sheet can be detected sufficiently to permit determination of the read-out conditions or the image processing conditions, that is, insofar as the light emitted from the stimulable phosphor sheet in the preliminary read-out can be detected sufficiently for the above-mentioned purposes. Thus, the aforesaid stimulation energy ratio should generally be within the range of 50% or less, preferably within the range of 10% or less, more preferably within the range of 3% or less. The lower limit of this ratio is determined according to the accuracy of the system for detecting the light emitted from the stimulable sheet in the preliminary read-out.

In the present invention, the stimulating ray source and the photoelectric read-out means for the preliminary read-out should preferably be used in common also for the final read-out as described below. In this case, in order to make the level of stimulation energy of the stimulating rays in the preliminary read-out lower than the level of the stimulation energy of the stimulating rays in the final read-out, it is possible to use any known method. For example, in the preliminary read-out, the output level of the laser source may be decreased, the beam diameter of the laser beam may be increased, the scanning speed of the laser beam may be increased, or the moving speed of the stimulable phosphor sheet may be increased.

In the above-described aspect of the present invention, since the image input conditions of a radiation image stored in the stimulable phosphor sheet can be investigated in advance, it is possible to obtain a radiation image having an improved image quality, particularly a high diagnostic efficiency and accuracy, regardless of the fluctuation in the radiographic exposure conditions, by adjusting the read-out gain on the basis of the detected image input information and without using a read-out system having a wide dynamic range. Further, since the image input pattern of the radiation image stored in the stimulable phosphor sheet can be investigated in advance, it is possible to obtain a radiation image having an improved image quality, particularly a high diagnostic efficiency and accuracy, by processing the read-out electric signal in the manner most suitable for the image input pattern, and/or by optimizing the scale factor. It is also possible to reduce the read-out time by omitting the final read-out for any portion of the stimulable phosphor sheet found to be carrying no image in the preliminary read-out.

In another aspect of the present invention, the stimulating ray source and the photoelectric read-out means for the preliminary read-out are used also for the final read-out, an adjusting means for making the level of the stimulation energy of the stimulating rays in the preliminary read-out lower than the level of the stimulating rays in the final read-out is provided, and the preliminary read-out and the final read-out are conducted by twice moving the stimulable phosphor sheet over the same section. In this aspect, it becomes possible to realize an apparatus of small size even when the preliminary read-out is carried out therein, in addition to the final read-out. In order to conduct the preliminary read-out and the final read-out by twice moving the stimulable phosphor sheet over the same section, the sheet may be returned once after the sheet is moved first over the section so that the sheet is moved twice in the same direction over the same section. Or, the preliminary read-out may be carried out when the sheet is moved forwardly, and the final read-out may be carried out when the sheet is moved backwardly.

BRIEF DESCRIPTION OF THE DRAWINGS

FIGS. 2, 3, 4, and 5 are schematic views showing further embodiments of the radiation image recording and read-out apparatus in accordance with the present invention.

DESCRIPTION OF THE PREFERRED EMBODIMENTS

The present invention will hereinbelow be described in further detail with reference to the accompanying drawings.

Figure 1:
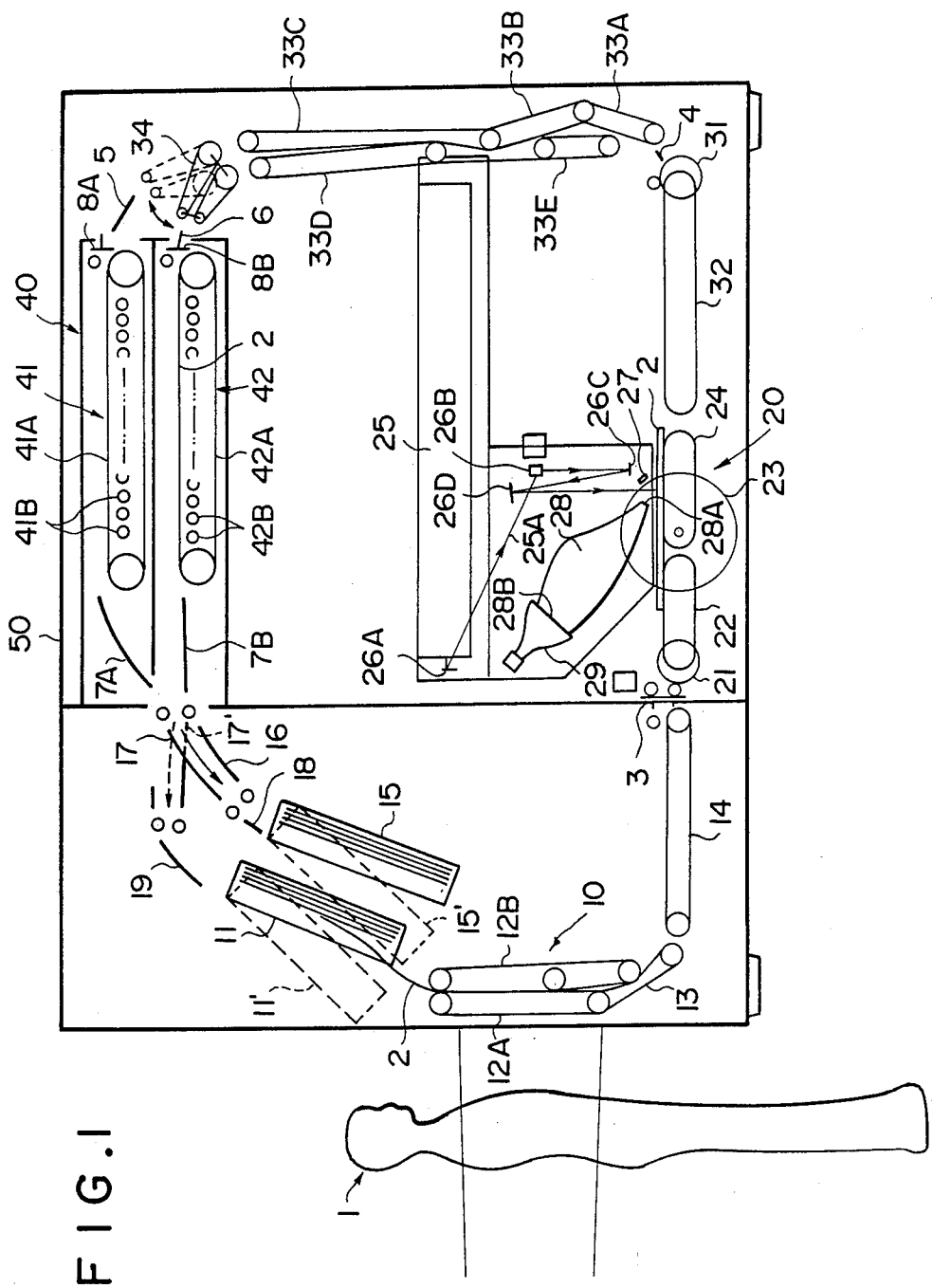
FIG. 1 is a schematic view showing an embodiment of the radiation image recording and read-out apparatus in accordance with the present invention.

FIG. 1 shows an embodiment of the radiation image recording and read-out apparatus in accordance with the present invention, wherein a radiation transmission image of, e.g., the frontal chest of an object in a standing position is recorded in a stimulable phosphor sheet. An image recording section 10 housed in a frame 50 is positioned at the same height as that of the frontal chest of an object 1. To the image recording section 10 are fed stimulable phosphor sheets 2 one by one from a sheet case 11 or 15 in the sheet feed position. The image recording section 10 comprises a pair of endless belts 12A and 12B for holding the sheet 2 therebetween, and an auxiliary endless belt 13 positioned under the endless belts 12A and 12B for receiving the sheet 2 from the endless belts 12A and 12B and guiding it to a conveyor belt 14. The conveyor belt 14 receives the sheet 2 from the image recording section 10 and conveys it to an image read-out section 20.

In the image read-out section 20, a first feed belt 22 driven by a motor 21 and a second feed belt 24 driven by a motor 23 are positioned in series to feed the sheet 2 at a predetermined speed in the sub-scanning direction. Between the image recording section 10 and the image read-out section 20 is positioned an openable shutter 3 for preventing any disturbing light from entering the image read-out section 20 from the image recording section 10 when the radiation image stored in the sheet 2 is read out in the image read-out section 20. In the image read-out section 20, a laser beam source 25 is positioned above the first feed belt 22 and the second feed belt 24. There are also positioned a mirror 26A, a galvanometer mirror 26B, a mirror 26C and a mirror 26D for scanning the sheet 2 on the belts 22 and 24 with a laser beam 25A emitted from the laser beam source 25. As the galvanometer mirror 26B is swung, the sheet 2 is scanned with the laser beam 25A in the main scanning direction. At the scanning position of the laser beam 25A on the sheet 2 is positioned a light guiding reflection mirror 27 along the main scanning line. Thus, light emitted from the sheet 2 upon stimulation thereof by the laser beam 25A, including the light emitted therefrom and reflected by the light guiding reflection mirror 27, enters a light guiding optical element 28 from a light input face 28A thereof. The light is guided inside of the light guiding optical element 28 through total reflection up to a light output face 28B of the light guiding optical element 28, and received by a photomultiplier 29 in close contact with the light output face 28B. In this manner, the light emitted from the sheet 2 in proportion to the radiation energy stored therein is detected and converted into an electric image signal by the photomultiplier 29. The electric image signal thus obtained is sent to an image processing circuit (not shown) and subjected therein to necessary image processing. The electric image signal thus processed is then sent to an image reproducing apparatus (not shown). As described above, the image reproducing apparatus may be a display device such as a CRT, or may be a photographic reproducing apparatus for reproducing a visible image in a photographic film by point-by-point scanning, or may be a memory device using e.g. a magnetic tape for memorizing the electric image signal for later use in image reproduction.

On the downstream side of the image read-out section 20 is positioned a feed belt 32 driven by a motor 31. Above the feed belt 32 on the downstream side thereof are vertically positioned endless belts 33A, 33B, 33C, 33D and 33E for holding and conveying the sheet 2. Further, above the group of endless belts 33A through 33E (i.e. on the downstream side thereof) is positioned a pair of belts 34 which are made pivotable so that the sheet conveying direction can be changed to distribute the sheets 2 in two directions. Between the downstream end portion of the feed belt 32 and the lower end portion of the group of belts 33A through 33E is positioned a guide plate 4 for guiding the sheet 2 from the former to the latter.

In front of the pair of belts 34 (i.e. on the downstream side thereof) is positioned an erasing section 40 comprising a pair of erasing units 41 and 42 installed one above the other. A guide plate 5 is positioned between the inlet of the erasing unit 41 and the pair of belts 34, and a guide plate 6 is positioned between the inlet of the erasing unit 42 and the pair of belts 34. The erasing unit 41 comprises a transparent endless belt 41A and a plurality of fluorescent lamps 41B positioned inside of the endless belt 41A, and the erasing unit 42 comprises a transparent endless belt 42A and a plurality of fluorescent lamps 42B positioned inside of the endless belt 42A. In the erasing section 40, since a long time is required for erasing, the sheet feed speed must, in an apparatus having a small size, be lower than that on the upstream side of the erasing section 40 in order that erasing can be carried out over a long time. Therefore, in the erasing section 40, the endless belts 41A and 42A are used alternately and the feed speeds thereof are adjusted to values far lower than the sheet feed speed on the upstream side of the erasing section 40, so that a long erasing time can be obtained with short endless belts. At the outlet of the erasing units 41 and 42 are positioned a guide plate 16 and a distribution plate 17 for distributing the sheets 2 conveyed out of the erasing units 41 and 42 via guide plates 7A and 7B to the sheet cases 11 and 15. Thus, the sheets 2 conveyed out of the erasing units 41 and 42 are alternately forwarded to the sheet cases 11 and 15.

In FIG. 1, the distribution plate 17 is in the position for guiding the sheets 2 into the lower sheet case 15, the lower sheet case 15 is in the position for receiving the sheets 2, and the upper sheet case 11 is in the position feeding the sheets 2 to the image recording section 10. The sheet cases 11 and 15 alternately repeat sheet receiving and sheet feeding. More specifically, when all of the sheets 2 housed in the upper sheet case 11 have been fed one by one to the image recording section 10, the sheet case 11 is moved up to the sheet receiving position indicated by a chain line 11'. Thereafter, the sheet case 15 containing the sheets 2 in the sheet receiving position is moved up to the sheet feed position indicated by a chain line 15', and the sheets 2 are fed one by one from the sheet case 15 to the image recording section 10. Thus the sheet cases 11 and 15 are installed for movement between the sheet receiving position and the sheet feed position. When the sheets 2 are fed from either one of the sheet cases 11 and 15, the other is in the position receiving the sheets 2. Thus, when one of the sheet cases 11 and 15 is used for sheet feeding and runs out of the sheets 2, then the positions of the sheet cases 11 and 15 are changed and the sheets 2 are fed from the other sheet case in which the sheets 2 have been accumulated.

Between the inlet portions of the erasing units 41 and 42 and the pair of belts 34 are positioned shutters 8A and 8B for preventing the erasing light from leaking out of the erasing units 41 and 42, which are surrounded by a lighttight member, and from entering the image read-out section 20. The shutter 8A is closed at least as long as the fluorescent lamps 41B of the erasing unit 41 are turned on to conduct erasing, and is opened when the sheet 2 is introduced into the erasing unit 41. Also, the shutter 8B is closed at least as long as the fluorescent lamps 42B of the erasing unit 42 are turned on, and is closed when the sheet 2 is introduced into the erasing unit 42. The fluorescent lamps 41B of the erasing unit 41 are turned off when the shutter 8A is opened, and the fluorescent lamps 42B of the erasing unit 42 are turned off when the shutter 8B is opened. Alternatively, the shutters 8A and 8B may be opened only after the read-out in the image read-out section 20 has been finished. At this time, the power source for the photomultiplier 29 in the image read-out section 20 should preferably be turned off so that no overcurrent will flow through the photomultiplier 29.

In the embodiment described above, the sheet 2 in which a radiation image is stored in the image recording section 10 is passed through the image read-out section 20, belts 33A through 33E, and the erasing section 40, and then returned to and temporarily housed in the sheet case 11 or 15. When a predetermined number of sheets 2 have been accumulated in the sheet case 11 or 15, the sheet case 11 or 15 is moved to the sheet feed position, and the sheets 2 are again fed one by one to the image recording section 10 and reused for image recording.

In the above-described embodiment, the sheet cases 11 and 15 are positioned between the image recording section 10 and the erasing section 40. However, the sheet cases 11 and 15 may be installed in any other position, for example, in front of or at the rear of the image read-out section 20. Also, instead of housing the image recording section 10, the image read-out section 20, and the erasing section 40 in the same frame 50 to constitute a single apparatus, the image recording section 10 may be positioned separately, for example, in a chamber different from the chamber housing the image read-out section 20 and the erasing section 40, and may be associated with the image read-out section 20 and the erasing section 40 by a conveying means such as a conveyor. Further, the positions of the light-shielding shutters 8A and 8B are not limited to those shown in FIG. 1. Thus the shutters 8A and 8B may be installed in any other positions insofar as they prevent the erasing light from entering the image read-out section 20. Or, two or more sets of such shutters may be installed.

Further, when the aforesaid preliminary read-out and the final read-out are carried out in the image read-out section 20, it is possible to conduct the preliminary read-out by rotating the belts 22 and 24 and feeding the sheet 2 in the sub-scanning direction, then reversely rotate the belts 22 and 24 to return the sheet 2, and again feed the sheet 2 forwardly to conduct the final read-out. It is also possible to conduct the final read-out when the sheet 2 is returned by reversely rotating the belts 22 and 24, and then to feed the sheet 2 forward to the next feed belt.

Figure 2:
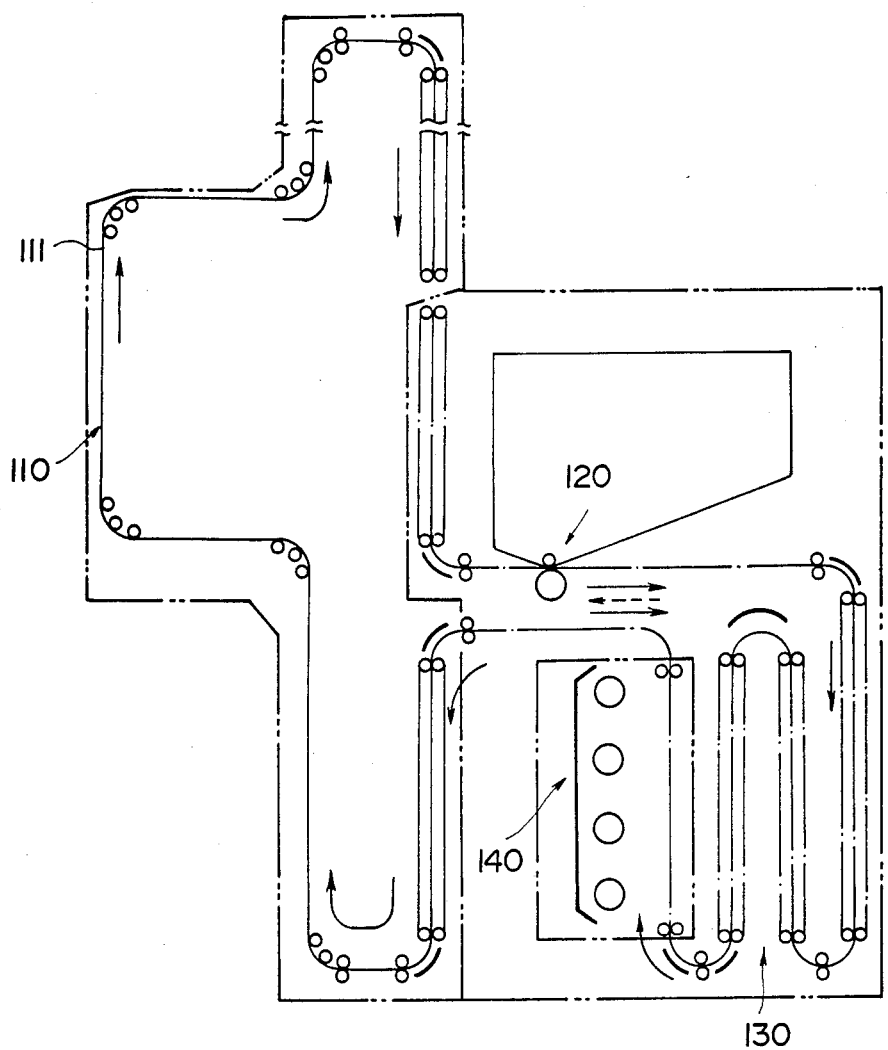

FIG. 2 shows another embodiment of the radiation image recording and read-out apparatus in accordance with the present invention, which is of the chest type suitable for recording an image of the frontal chest of the human body. In FIG. 2, the components of the apparatus have the same functions as those in the embodiment of FIG. 1. An image of a radiation passing through an object is recorded in a stimulable phosphor sheet (not shown) in an image recording section 110, and the stimulable phosphor sheet carrying the radiation image stored therein is conveyed up by a conveyor belt 111 towards an image read-out section 120. In the image read-out section 120, the stimulable phosphor sheet is scanned with stimulating rays by use of the same components as those employed in the embodiment of FIG. 1, and light emitted from the stimulable phosphor sheet upon stimulation thereof is photoelectrically detected. In the image read-out section 120, the stimulable phosphor sheet may be reciprocated as described above to conduct the preliminary read-out when the sheet is moved forward a first time and to conduct the final read-out when the sheet is moved forward a second time. Or, the preliminary read-out may be carried out when the sheet is moved forward, and the final read-out may be conducted when the sheet is moved backward. After the image read-out step is over, the sheet is conveyed by a group of belts 130 to an erasing section 140, and then again conveyed to the image recording section 110 for reuse in image recording.

Figure 3:
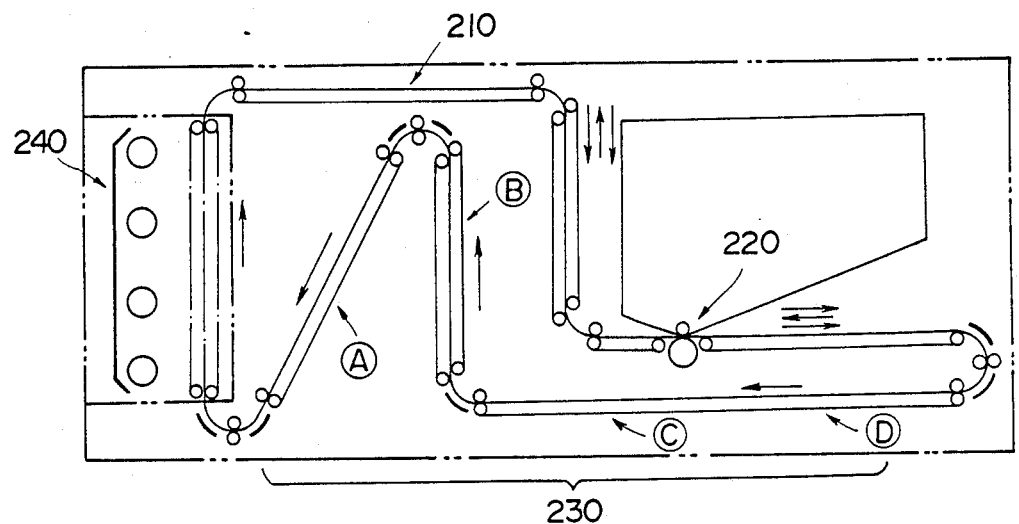

FIG. 3 shows a further embodiment of the radiation image recording and read-out apparatus in accordance with the present invention, which is of the bed type for recording an image of an object in a lying position. Also in FIG. 3, the components of the apparatus have the same functions as those in the embodiment of FIG. 1. An image recording section 210 is positioned horizontally, and a bed (not shown) on which the object lies is positioned on the image recording section 210. A stimulable phosphor sheet carrying a radiation image stored therein in the image recording section 210 is sent rightward in the drawing, and the preliminary read-out and the final read-out are conducted by the reciprocating movement of the sheet in an image readout section 220. After the read-out step is over, the sheet is conveyed by a group of belts 230 to an erasing section 240, and then sent to the image recording section 210. Thus, the sheet is circulated and reused for image recording.

The group of belts 230 is provided with waiting zones A, B, C and D in which the stimulable phosphor sheets can wait for the next operation. Thus the sheets passing through the image read-out section 220 enter the erasing section 240 via the waiting zones A through D. In the waiting zones A through D, four sheets which have passed through the image recording and read-out steps can wait for the next operation. Since the sheets can also be positioned simultaneously in the erasing section 240, the image recording section 210 and the image read-out section 220, up to about eight sheets can be circulated and used in the apparatus. In this embodiment, though the group of belts 230 is positioned between the image read-out section 220 and the erasing section 240, it is also possible to position the group of belts 230 on the upstream side or the downstream side of the image recording section 210.

Figure 4:
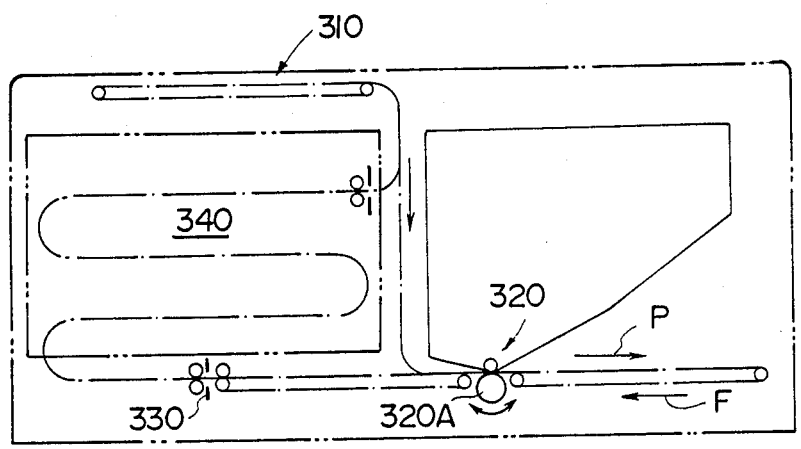

FIG. 4 shows a still further embodiment of the radiation image recording and read-out apparatus in accordance with the present invention, which is of the bed type. In this embodiment, after the stimulable phosphor sheet is sent from the image recording section 310 to the image read-out section 320, the sheet is reciprocated by a reciprocating roller 320A in the image read-out section 320 to carry out the preliminary read-out (P) and the final readout (F). Thereafter, the sheet is sent to an erasing section 340 via a shutter 330 and then to the image recording section 310.

In the embodiment of FIG. 4, the preliminary read-out is conducted while the sheet is moved in the P direction in the image read-out section 320, and the final read-out is conducted while the sheet is moved reversely in the F direction. Then, the sheet is sent to the erasing section 340.

The embodiment shown in FIG. 5 is similar to that shown in FIG. 1 except that a separate preliminary read-out section 20' and final read-out section 20" are used. Reference numbers are the same as for FIG. 1 except that a single prime refers to elements in the preliminary read-out section 20' and a double prime refers to elements in the final read-out section 20".

What is claimed is

1. A radiation image recording and read-out apparatus comprising:
   (i) a circulating and conveying means for conveying a plurality of stimulable phosphor sheets for recording a radiation image thereon along a predetermined circulation path, said circulating and conveying means comprising a plurality of independent conveying means for conveying said plurality of stimulable phosphor sheets independently, each of said plurality of independent conveying means conveying said plurality of stimulable phosphor sheets by friction between said plurality of independent conveying means and said plurality of stimulable phosphor sheets,
   (ii) an image recording means, positioned on said circulation path, for recording a radiation transmission image of an object on said plurality of stimulable phosphor sheets to a radiation passing through said object, said image recording means including one of said plurality of independent conveying means which is controlled in accordance with operation of said image recording means,
   (iii) an image read-out means, positioned on said circulation path and provided with a stimulating ray source, for emitting stimulating rays for scanning said plurality of stimulable phosphor sheets carrying said radiation image stored therein in said image recording means, and a photoelectric read-out means for detecting light emitted from said plurality of stimulable phosphor sheets scanned with said stimulating rays to obtain an electric image signal, said image read-out means including one of said plurality of independent conveying means which is controlled in accordance with operation of said image read-out means, and
   (iv) an erasing means for, prior to the next image recording on said plurality of stimulable phosphor sheets for which the image read-out has been conducted in said image read-out means, exposing said plurality of stimulable phosphor sheets to erasing light to release the radiation energy remaining in said plurality of stimulable phosphor sheets, said erasing means including one of said plurality of independent conveying means which is controlled in accordance with operation of said erasing means,
   wherein said independent conveying means further comprises means for conveying said plurality of stimulable phosphor sheets at different rates, in accordance with rates of passage of said plurality of stimulable phosphor sheets through each of said image recording means, said image read-out means, and said erasing means.

2. An apparatus as defined in claim 1 wherein said circulating and conveying means is constructed so as to convey a plurality of stimulable phosphor sheets sequentially through said image recording means, said image read-out means and said erasing means and, at the same time, to stop one stimulable phosphor sheet at each of said image recording means and said image read-out means and at least one stimulable phosphor sheet at said erasing means.

3. An apparatus as defined in claim 1 or 2 wherein said circulating and conveying means comprises a plurality of endless belts positioned in series.

4. An apparatus as defined in claim 1 wherein at least one of the portions of said circulating and conveying means positioned between said image recording means and said image read-out means, between said image read-out means and said erasing means, and between said erasing means and said image recording means has a length sufficient for allowing at least one stimulable phosphor sheet to wait for the next operation.

5. An apparatus as defined in claim 1 wherein said circulating and conveying means is provided with a means for temporarily accumulating said stimulable phosphor sheets on the upstream side or the downstream side of said image recording means.

6. An apparatus as defined in claim 1 wherein said image read-out means conducts both preliminary read-out and final read-out.

7. An apparatus as defined in claim 6 wherein said image read-out means conducts preliminary read-out and final read-out by use of different stimulating ray sources and different photoelectric read-out means.

8. An apparatus as defined in claim 6 wherein said image read-out means conducts preliminary read-out and final read-out by use of a single stimulating ray source and a single photoelectric read-out means.

9. An apparatus as defined in claim 8 wherein said image read-out means conducts preliminary read-out by use of a stimulating ray source and a photoelectric read-out means while said stimulable phosphor sheet is moved in one direction, once returns said stimulable phosphor sheet in the reverse direction, and then conducts final read-out by use of the same stimulating ray source and the same photoelectric read-out means as those used for the preliminary read-out while said stimulable phosphor sheet is moved in the same direction as said one direction.

10. An apparatus as defined in claim 8 wherein said image read-out means conducts preliminary read-out by use of a stimulating ray source and a photoelectric read-out means while said stimulable phosphor sheet is moved in one direction, and then conducts final read-out by use of the same stimulating ray source and the same photoelectric read-out means as those used for the preliminary read-out while said stimulable phosphor sheet is returned in the reverse direction.

11. A radiation image recording and read-out apparatus comprising:
   (i) a circulating and conveying means for conveying a plurality of stimulable phosphor sheets for recording a radiation image thereon along a predetermined circulation path, said circulating and conveying means comprising a plurality of independent conveying means for conveying said plurality of stimulable phosphor sheets independently, each of said plurality of independent conveying means conveying said plurality of stimulable phosphor sheets by friction between said plurality of independent conveying means and said plurality of stimulable phosphor sheets,
   (ii) an image recording means, positioned on said circulation path, for recording a radiation transmission image of an object on said plurality of stimulable phosphor sheets to a radiation passing through said object, said image recording means including one of said plurality of independent conveying means which is controlled in accordance with operation of said image recording means, (iii) an image read-out means, positioned on said circulation path and provided with a stimulating ray source, for emitting stimulating rays for scanning said plurality of stimulable phosphor sheets carrying said radiation image stored therein in said image recording means, and a photo-electric read-out means for detecting light emitting from said plurality of stimulable phosphor sheets scanned with said stimulating rays to obtain an electric image signal, said image read-out means including one of said plurality of independent conveying means which is controlled in accordance with operation of said image read-out means, (iv) and erasing means for, prior to the next image recording on said plurality of stimulable phosphor sheets for which the image read-out has been conducted in said image read-out means, exposing said plurality of stimulable phosphor sheets to erasing light to release the radiation energy remaining in said plurality of stimulable phosphor sheets, said erasing means including one of said plurality of independent conveying means which is controlled in accordance with operation of said erasing means, wherein said independent conveying means further comprises means for conveying said plurality of stimulable phosphor sheets at different rates, in accordance with rates of passage of said plurality of stimulable phosphor sheets through each of said image recording means, said image read-out means, and said erasing means, (v) at least one frame for housing at least said image read-out means and said erasing means, and (vi) a light shielding shutter positioned between said image read-out means and said erasing means in said same frame for preventing the erasing light from entering said image read-out means at least while one of said plurality of stimulable phosphor sheets is present in said image read-out means and image read-out is carried out therein.

12. An apparatus as defined in claim 11 wherein said photoelectric read-out means further comprises a photomultiplier having a power source which is turned off while said shutter is opened, and said shutter is opened only after the read-out operation in said image read-out means is finished.

13. An apparatus as defined in claim 11 wherein said erasing means further comprises an erasing light source, which is turned off while said shutter is opened.

* * * * *